(12) United States Patent
Katibian et al.

(10) Patent No.: US 7,120,162 B1
(45) Date of Patent: Oct. 10, 2006

(54) SYSTEM AND METHOD FOR PROCESSING AUDIO AND VIDEO DATA IN A WIRELESS HANDSET

(75) Inventors: Behnam S. Katibian, Irvine, CA (US); Albert A. Hsueh, Laguna Niguel, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 690 days.

(21) Appl. No.: 09/631,511

(22) Filed: Aug. 3, 2000

(51) Int. Cl.
*H04J 15/00* (2006.01)

(52) U.S. Cl. .................. 370/464; 370/464; 370/437; 370/431

(58) Field of Classification Search ............. 370/229, 370/235, 431, 437, 464–469, 474, 473–4; 455/3.01, 418, 422.1, 464; 718/100, 102, 718/103; 348/14.01–14.02, 584–5; 709/100, 709/102–103
See application file for complete search history.

(56) References Cited

U.S. PATENT DOCUMENTS

| 5,561,466 | A | * | 10/1996 | Kiriyama ............... 375/240.25 |
| 5,608,651 | A | * | 3/1997 | Leavy et al. ............. 348/14.12 |
| 5,784,572 | A | * | 7/1998 | Rostoker et al. ............ 709/247 |
| 5,982,360 | A | * | 11/1999 | Wu et al. .................... 345/535 |
| 5,991,313 | A | * | 11/1999 | Tanaka et al. ............... 370/537 |
| 6,016,166 | A | * | 1/2000 | Huang et al. ................ 348/515 |
| 6,111,863 | A | * | 8/2000 | Rostoker et al. ............ 370/329 |
| 6,396,816 | B1 | * | 5/2002 | Astle et al. .................. 370/264 |
| 6,445,686 | B1 | * | 9/2002 | Hoffbeck et al. ........... 370/318 |
| 6,477,185 | B1 | * | 11/2002 | Komi et al. ................. 370/536 |
| 6,484,285 | B1 | * | 11/2002 | Dent .......................... 714/791 |
| 6,510,325 | B1 | * | 1/2003 | Mack et al. ............. 455/575.2 |
| 6,516,005 | B1 | * | 2/2003 | Murayama et al. ......... 370/503 |
| 6,522,672 | B1 | * | 2/2003 | Matsuzaki et al. .......... 370/539 |
| 6,563,513 | B1 | * | 5/2003 | Yu et al. ..................... 345/698 |
| 6,567,475 | B1 | * | 5/2003 | Dent et al. .................. 375/286 |
| 6,570,080 | B1 | * | 5/2003 | Hasegawa et al. ............ 84/609 |
| 6,584,509 | B1 | * | 6/2003 | Putzolu ...................... 709/240 |
| 6,611,674 | B1 | * | 8/2003 | Jokimies et al. .............. 455/69 |
| 6,681,120 | B1 | * | 1/2004 | Kim ........................ 455/556.1 |
| 6,728,795 | B1 | * | 4/2004 | Farazmandnia et al. ...... 710/22 |
| 6,738,357 | B1 | * | 5/2004 | Richter et al. .............. 370/263 |
| 2001/0031043 | A1 | * | 10/2001 | Kim ........................ 379/90.01 |
| 2002/0065076 | A1 | * | 5/2002 | Monroe ...................... 455/426 |
| 2002/0127696 | A1 | * | 9/2002 | Meade ......................... 455/41 |

\* cited by examiner

*Primary Examiner*—Chun Cao
*Assistant Examiner*—Malcolm Cribbs
(74) *Attorney, Agent, or Firm*—Jackson Walker L.L.P.; Christopher J. Rourk (57) ABSTRACT

A system for processing audio and video data for a wireless handset is provided. The system includes an audio sampler receiving audio data and converting the audio data into digitally encoded audio data. The system also includes a digital imager receiving image data and converting the image data to digitally encoded image data. A processor coupled to the audio sampler and the digital imager and receives the digitally encoded audio data and the digitally encoded image data and gives processing priority to one of the digitally encoded audio data and the digitally encoded image data.

20 Claims, 7 Drawing Sheets

SYSTEM AND METHOD FOR PROCESSING AUDIO AND VIDEO DATA IN A WIRELESS HANDSET

RELATED APPLICATIONS

This application is related to U.S. patent application Ser. No. 09/631,508, filed Aug. 3, 2000, which is abandoned.

FIELD OF THE INVENTION

The present invention pertains to the field of wireless telecommunications handsets. More specifically, the invention relates to a system and method for processing audio and video data in a wireless handset that allows processing priority to be given to either the audio or the video data.

BACKGROUND

The transmission of low bit rate multimedia data is known in the art. For example, the International Telecommunications Union standard H.223 "Series H: Transmission of Non-Telephone Signals—Multiplexing Protocol for Low Bit Rate Multimedia Communications," including annexes A through D, addresses combination of audio, video, and data in a single low bit rate data stream. Nevertheless, although implementation of such combinations of audio and video data for desktop video telephone sets and other stationary applications are known, the implementation of audio and video data in a wireless device is not completely addressed by any of the prior art.

One reason why the combination of audio and video data in a wireless device has not been addressed may be because wireless handsets have significant power and processor capability constraints that limit the ability of the wireless handset to handle audio and video data. The ways in which audio and video data are processed for transmission in a stationary device, where size and power requirements are not limited, are not directly applicable to a wireless handset, where the reduced processor power and transmission power, the requirement for interaction with wireless transmission protocols, and other requirements and limitations of wireless handsets prevent direct application of stationary device design to the wireless handset.

Thus, while standards for the combination of audio and video data for stationary devices have been developed, these standards do not address the unique requirements of wireless devices, which are generally perceived as being unable to transmit, receive, and process audio and video data.

SUMMARY OF THE INVENTION

In accordance with the present invention, a system and method for processing audio and video data in a wireless handset are provided that overcome known problems with processing audio and video data in wireless handsets.

In particular, a system and method for processing audio and video data in a wireless handset are provided that processor resources to allocated to the preferred communications data type, thus ensuring that the level of service desired by the user is provided.

In accordance with an exemplary embodiment of the present invention, a system for processing audio and video data for a wireless handset is provided. The system includes an audio sampler receiving audio data and converting the audio data into digitally encoded audio data. The system also includes a digital imager receiving image data and converting the image data to digitally encoded image data. A processor coupled to the audio sampler and the digital imager and receives the digitally encoded audio data and the digitally encoded image data and gives processing priority to one of the digitally encoded audio data and the digitally encoded image data.

The present invention provides many important technical advantages. One important technical advantage of the present invention is a system and method for processing audio and video data in a wireless handset that allows priority levels to be assigned to the processing of the video and audio data, such that processor resources, which are typically limited, can be applied to the type of data that is of primary importance before data that has a secondary importance is processed.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Figure 1:
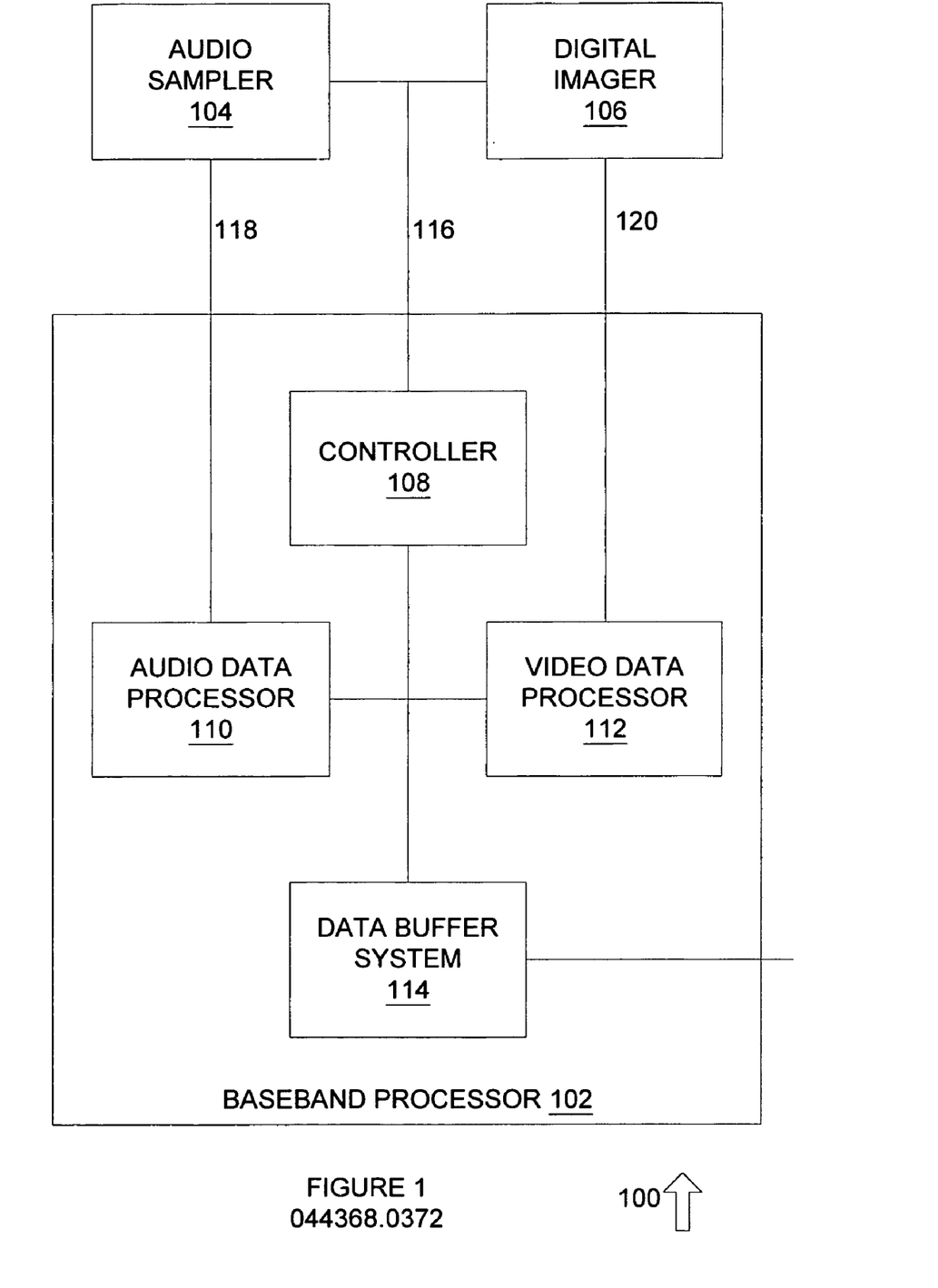
FIG. 1 is a diagram of a system for transmitting and processing audio and video data from a wireless handset in accordance with an exemplary embodiment of the present invention.

FIG. 1 is a diagram of a system 100 for transmitting and processing audio and video data from a wireless handset in accordance with an exemplary embodiment of the present invention. System 100 allows audio data and video data to be processed and transmitted from a wireless handset and is compatible with the processing and power limitations of wireless handsets.

System 100 includes baseband processor 102, audio sampler 104, and digital imager 106, which can be contained within a wireless handset housing. Baseband processor 102 and audio sampler 104 can be implemented as suitable existing wireless handset baseband processors and audio samplers. Digital imager 106 can be a digital imager, model number CX20450, provided by Conexant Systems, Inc. of Newport Beach, Calif., or other suitable imagers with different numbers of picture elements ("pixels") and array structures.

Baseband processor 102 includes controller 108, audio data processor 110, video data processor 112, and data buffer system 114, each of which can be implemented in hardware, software, or a suitable combination of hardware and software, and which can be one or more software systems operating on a digital signal processing device of baseband processor 102. As used herein, a software system can be implemented as one or more objects, agents, lines of code, subroutines, separate software applications, two or more lines of code operating two or more software applications, or other suitable software architectures. In one exemplary embodiment, a software system can be a first line of code in a general purpose baseband operating system, and a second line of code in a specific purpose software module operating on the baseband processor.

Controller 108 is coupled to audio data processor 110, video data processor 112, and data buffer system 114. As used herein, the term "couple" and its cognate terms such as "couples" and "coupled" can refer to a physical connection (such as copper conductor), a virtual connection (such as randomly-assigned memory locations of a data memory device), a logical connection (such as through logical devices of a semiconducting circuit), other suitable connections, or a suitable combination of such connections. In one exemplary embodiment, systems and components can be coupled to other systems and components through intervening systems and components, such as through an operating system of a digital signal processor.

Controller 108 is coupled to audio sampler 104 and digital imager 106 by connection 116, which can be a data bus, or one or more physical connections through a circuit board, or other suitable connections. Controller 108 can provide control data to audio sampler 104 and digital imager 106 so as to cause the audio sample rate or the digital image generation rate, respectively, to be varied to match process requirements of baseband processor 102.

Controller 108 also provides control data to audio data processor 110 and video data processor 112 to control the rate of data processing. In one exemplary embodiment, predetermined data can be entered by a user to control the priority of audio or video data processing, such as when a user wishes to transmit higher quality audio data or video data. In a wireless handset, power and processor limitations typically prevent both audio data and video data from being transmitted at desirable quality levels. Thus, controller 108 can allow a user to select different operating modes in accordance with user's needs, so as to allow the user to receive a preferred data type at a higher quality than the secondary data type.

In one exemplary embodiment, a user can engage in a conversation, such that audio-only mode is selected. The user may then send a single picture of high image resolution quality. In this exemplary embodiment, the user can select to change from the audio-only data mode to a video-only data mode, such that only video data is transmitted at a predetermined image quality, such as a 640×480 pixel image. In this exemplary embodiment, controller 108 can receive suitable data commands from the user, such as through keypad entries or verbal commands, and can cause audio sampler 104 and audio data processor 110 to cease operations and can likewise cause digital imager 106 and video data processor 112 to generate a high quality video image data for transmission. Likewise, when the user has completed transmission of the image data, the user may enter suitable commands to cause controller 108 to return to an audio-only mode, such as where digital imager 106 and video data processor 112 are disabled and audio sampler 104 and audio data processor 110 are allowed to perform at peak capacity.

In another exemplary embodiment, the wireless handset can be used to transmit audio data and video data simultaneously, where the video data can be given a secondary priority to the audio data. In this manner, video data processor 112 can use suitable video data processing techniques to transmit image quality in accordance with available video data processing power. Thus, when baseband processor 102 processing capability is being used to process audio data, the video data will be decreased in quality, but during pauses in conversation where audio data processing is not being performed, video data processing can be performed thus improving the quality of the video data. In this manner, baseband processor 102 can be advantageously used in a peak processing mode, as opposed to existing wireless handset applications where the baseband processor must be sized for the instantaneous peak, but may be dormant or used to less than maximum capacity over time.

Audio data processor 110 and video data processor 112 can be implemented in hardware, software, or a suitable combination of hardware and software, and can be one or more software systems operating on a digital signal processor of a baseband processor 102. Audio data processor 110 and video data processor 112 receive audio and video data, respectively, and process the data to reduce the volume of data that is required to transmit the data. In one exemplary embodiment, audio data processor 110 performs audio data compression in accordance with ITU-T audio compression standard G.723 and video data processor 112 performs video data compression in accordance with the MPEG 4 or H263 video compression standards.

Data buffer system 114 can be implemented in hardware, software, or a suitable combination of hardware and software, and can be one or more digital data memory devices of a digital signal processor or of baseband processor 102. In one exemplary embodiment, data buffer system 114 is one or more random access memory devices that have been partitioned into predetermined data buffer areas.

In operation, system 100 allows a user to receive and transmit audio and video data from a wireless handset. System 100 further allows the user to select priority modes for the audio and video data, such that the user can select for the audio data processing and transmission to be given priority over video data, for video data processing and transmission to be given priority over audio data, or for intermediate values of audio and video data priority to be assigned to meet the user's particular needs and requirements. Likewise, system 100 can receive audio and video data according to predetermined encoding priorities from the sender. A user can also elect to receive video data and transmit and receive audio data, to receive audio data and transmit and receive video data, to receive only video data or transmit only video data, to receive video data when transmitting audio data and to transmit audio data when receiving video data, to receive audio and video data simultaneously and then transmit audio and video data simultaneously, or other suitable combinations may be processed by the system of system 100.

Figure 2:
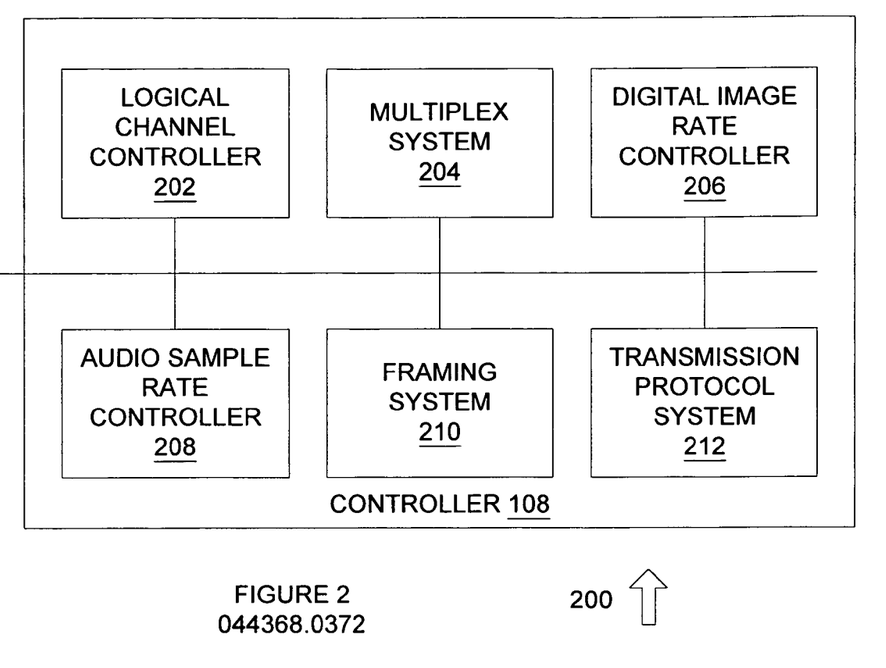
FIG. 2 is a diagram of a system for controlling the processing and transmission of audio and video data from wireless handsets in accordance with an exemplary embodiment of the present invention.

FIG. 2 is a diagram of a system 200 from controlling the processing and transmission of audio and video data from wireless handsets in accordance with an exemplary embodiment of the present invention. System 200 includes controller 108, logical channel controller 202, multiplex system 204, digital image rate controller 206, audio sample rate controller 208, framing system 210, and transmission protocol system 212, each of which can be implemented in hardware, software, or a suitable combination of hardware and software, and which can be one or more software systems operating on a baseband processor of a wireless handset.

Logical channel controller 202 controls the assignment of logical channels to audio, video, and control data. In one exemplary embodiment, audio data can be assigned to a first logical channel, video data can be assigned to a second logical channel, and control data can be assigned to a third logical channel, such that predetermined relationships between the channels can be used to separate the audio, video, and control data. Logical channel controller 202 can further control the placement of logical channels within a transmission data frame. For example, a transmission data frame can include a predetermined number of slots of data, where each slot can include a predetermined number of bits. In the following exemplary embodiment, the transmission data frame includes a flag slot that includes predetermined data sequence, such as "01111110." The flag slot is followed by a header slot that includes suitable data, such as a packet marker data field, a multiplex code data field, and a header error control data field. The header slot can be used to identify the protocol and format of the remaining slots in the transmission data packet.

Transmission Data Packet, so as to indicate that the remainder of LCN2 is being transmitted in one or more subsequent Transmission Data Packets. Thus, logical channel controller 202 receives data from various logical channels such as audio data, video data, and control data, and assembles the logical channels into Transmission Data Packets in accordance with predetermined slot sequences Multiplex system 204 is coupled to logical channel controller 202 and controls the slot sequences used to combine data into a Transmission Data Packet. In the exemplary embodiment shown in Table 1, the logical channel 1 audio data and logical channel 2 video data are assembled by multiplex system 204. Multiplex system 204 interfaces with the adaptation layer of the wireless handset, which includes the physical devices of the wireless handset that generate data. In one exemplary embodiment, the adaptation layer of the wireless handset includes an audio sampling and audio data generation device, a video sampling and video data generation device, and a control data generation device, such as a keypad or voice recognition system.

Multiplexing system 204 can receive the audio data, video data, and control data, and can assemble the classes of data into predetermined service data packets. The size of these predetermined service data packets will be determined in part by the amount of bandwidth available to connect the wireless device to a base station, the quality of audio and video and control data selected, processor capacity, and by other parameters of the system. Thus, the number of slots in a transmission data packet and the number slots required for audio data, video data, and control data will be determined in part by bandwidth and the processing capacity of the processor.

Digital image rate controller 206 receives data from audio data processor 110 and video data processor 112, transmission protocol system 212, and multiplex system 204 and generates control data to control the generation of digital image data from a digital imager 106. In one exemplary embodiment, digital image rate controller 206 can decrease the number of frames per second of data generated by digital imager 106 so as to reduce or eliminate the amount of data overflow in a digital image buffer. Likewise, digital image rate controller 206 can receive data from video data proces-

| LCN1 [3 Slots] | LCN2 [5 Slots] | Transmission Data Packet [8 Slots] |
|---|---|---|
| [FLAG] [HEADER] [LCN-1] [LCN1-2] [LCN1-3] [LCN2-1] [LCN2-2] [FLAG] | | |

In this exemplary embodiment, two logical channels are used as payload data in the Transmission Data Packet, which has a total of 8 slots available for transmission. The payload is included after the flag data and the header data slots, and a final flag data slot is used to delimit the Transmission Data Packet. The first logical channel, LCN1, is an audio channel. This audio channel includes three slots of non-segmentable data that make up an audio data packet. The remaining slots in the transmission data packet comprise a portion of a segmentable video data packet, LCN2. The video service data packet includes 5 slots of data. As the Transmission Data Packet in this exemplary embodiment only has eight total slots, only the first two video data slots can be transmitted in the data transmission data packet shown. Data is then included with the header data packet to indicate that an incomplete LCN2 data packet was transmitted with the sor 112 that indicates that video data received from digital imager 106 is not being processed by video data processor 112 due to the current processor load created by processing of audio data. Digital image rate controller 206 can then generate control commands that cause digital imager 106 to generate less frames of video data per second so that video data processor 112 can process all of the frames of data generated. In this manner, video data processor 112 may utilize the maximum amount of processor capabilities on baseband processor 102 as such processor capacity changes over time as a result of changes in audio data processed by audio data processor 110.

Audio sample rate controller 208 is coupled to multiplex system 204, transmission protocol system 212, logical channel controller 202, and audio data processor 110, and generates audio sample rate control data for use with audio sampler 104. Audio sample rate controller 208 is similar to digital image rate controller 206 in that it can adjust the rate of audio sample generation to take advantage of available processor capacity of baseband processor 102, such as when video data has been given transmission and processor priority, so that audio data can be processed and transmitted on an as-available basis.

Framing system 210 is coupled to multiplex system 204 and logical channel controller 202, and arranges audio, video, and control data in predetermined packets or data units. In one exemplary embodiment, framing system 210 can create service data units and protocol data units for each logical channel from the adaptation layer, and can also interface with multiplex system 204 to assemble slots of data into transmission data packets. For example, a transmission data packet may include a protocol data unit that is made up of one or more service data units, and each service data unit may be made up of one or more protocol data units from the adaptation layer. Framing system 210 is used to control packet size and arrangement.

In one exemplary embodiment, framing system 210 can process data as it is assembled into packets so as to ensure that the data does not replicate the flag slot data that is used to delimit a Transmission Data Packet. If the flag data sequence is "01111110," then framing system 210 can process data so that any sequence of "01111110" in the data is broken up, such as by replacing it with "011111010," such that a zero is inserted after every sequence of five ones. Framing system 210 can also scan incoming data and replace sequences of "011111010" in the data with "01111110."

Transmission protocol system 212 receives predetermined transmission protocol data for use in allocating processor and transmission capacity. In one exemplary embodiment, transmission protocol system 212 includes error control functionality, multiplex code functionality that contains predetermined tabular data for assigning logical channels and structures in accordance with predetermined audio and video processing and transmission capacity, and other suitable data for controlling the transmission of audio and video data.

In operation, system 200 is used to control the handling of audio, video, and control data in a processor between the point where the data is received at the processor and the point where the data is transmitted from the processor to a transceiver for transmission over a wireless channel. System 200 thus controls the generation of audio and video data, such as sampling rates and digital image generation rates, monitors audio and video data processing effectiveness to determine if data overflow or other non-processing of data occurs, and controls the assembling of process data into data packets for transmission. Controller 200 thus is used to allocate processor and transmission capacity in a wireless handset, where such processing and transmission capacities may be constrained by the physical requirements of wireless handsets.

Figure 3:
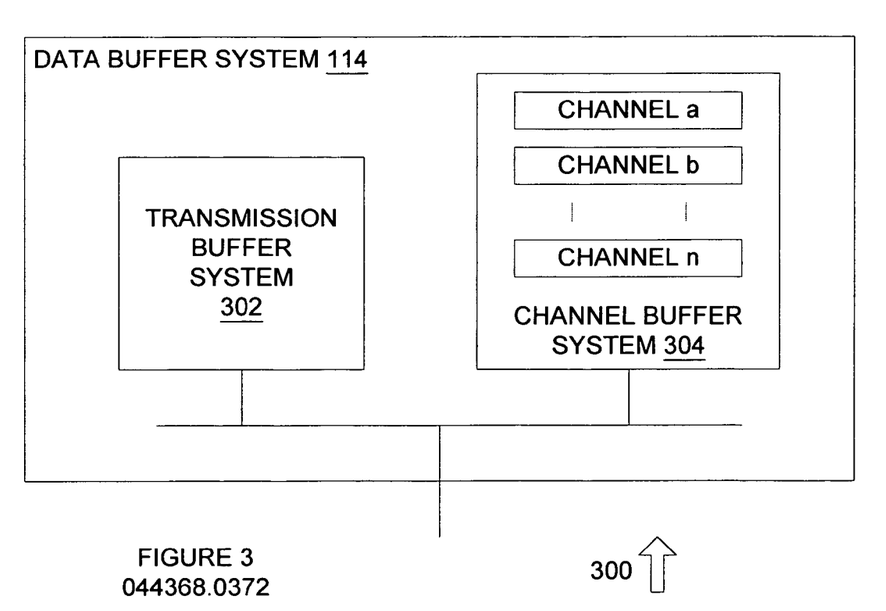
FIG. 3 is a diagram of a system for storing data in accordance with an exemplary embodiment of the present invention.

FIG. 3 is a diagram of a system 300 for storing data in accordance with an exemplary embodiment of the present invention. System 300 includes data buffer system 114, transmission buffer system 302, and channel buffer system 304, each of which can be implemented in hardware, software, or a suitable combination of hardware and software, and which can be allocated data memory locations in a data memory device.

Transmission buffer system 302 is used to store transmission data packets as they are assembled by controller 108. In one exemplary embodiment, transmission buffer system 302 includes a predetermined number of slots of data, where each slot includes a predetermined number of bits of data. Transmission buffer system 302 receives data from channel buffer system 304, and controller 108, and stores the data in the sequence received in response to control signals from controller 108. Transmission buffer system 302 then transfers the data to a suitable digital transceiver for transmission over a wireless channel. Transmission buffer system 302 can also be used to receive an incoming data packet for subsequent allocation to channels in channel buffer system 304.

Channel buffer system 304 includes a plurality of channels "a" through "n" that are used to logically separate channels of data, such as audio data, video data, and control data. The channels stored in channel buffer system 304 can include predetermined channel sizes that are based upon wireless channel bandwidth, processor capacity, and other suitable data. In one exemplary embodiment, a first channel is allocated for audio data and includes an optional sequence number field that is used to determine the sequence number of a service data packet, a payload data field that is used to hold a predetermined number of bits of payload data, and a control record check field that is used to store a control record check value based upon the data stored in the remainder of the channel. In this manner, the protocol data unit stored within the channel is comprised of a plurality of other data fields. Channel buffer system 304 thus allows audio, video, and control data to be stored as it is accumulated and further provides the stored data for assembly by transmission buffer system 302. Channel buffer system 304 can include a suitable number of logical channels, such as an audio channel, an audio overflow channel, a video channel, a video overflow channel, a data channel, a data overflow channel, and other suitable channels.

In operation, system 300 allows audio data, video data, and control data to be stored after processing and assembled for transmission in a data transmission packet. System 300 allows data priority for processing and transmission to be adjusted between audio and video data, such that a wireless handset user can controllably change the priority to be given to the audio data, the video data, and that control data can override the audio data and video data as needed.

Figure 4:
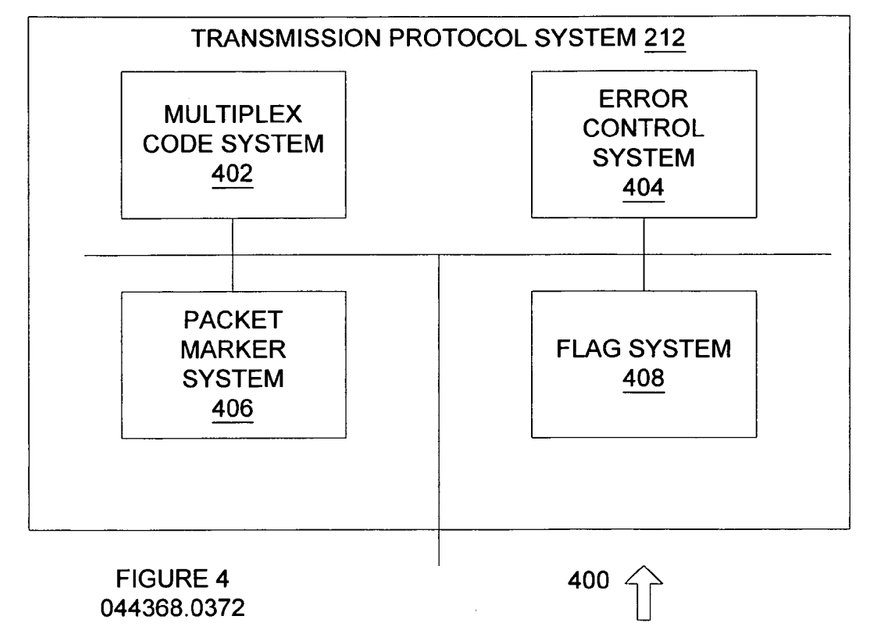
FIG. 4 is a diagram of a system for controlling transmission protocol in accordance with an exemplary embodiment of the present invention.

FIG. 4 is a diagram of a system 400 for controlling transmission protocol in accordance with an exemplary embodiment of the present invention. System 400 includes transmission protocol system 212, multiplex code system 402, error control system 404, packet marker system 406, and flag system 408, each of which can be implemented in hardware, software, or a suitable combination of hardware and software, and which can be one or more software systems operating on a baseband processor of a wireless handset.

Multiplex code system 402 is used to process predetermined data that identifies logical channel structure for data to be processed in data transmission packets. In one exemplary embodiment, multiplex code system 402 includes a table having the following structure:

| Row | Multiplex Entry Descriptor | Element List Size | Nesting Depth | Subelement List Size | Description |
|---|---|---|---|---|---|
| 1 | {LCN1,RCUCF} | 1 | 0 | 0 | All audio |
| 2 | {LCN2,RCUCF} | 1 | 0 | 0 | All Video |

-continued

| Row | Multiplex Entry Descriptor | Element List Size | Nesting Depth | Subelement List Size | Description |
|---|---|---|---|---|---|
| 3 | {LCN2,RC}, {LCN1,RC3 UCF} | 2 | 0 | 0 | All audio, 2+ video |
| 4 | {LCN1,RC}, {LCN2,RC3 UCF} | 2 | 0 | 0 | All video, 2+ audio |

In this exemplary embodiment, the multiplex code system 402 table includes a plurality of rows each of which includes a multiplex entry descriptor, an element list size, a nesting depth, and a sub-element list size. In the exemplary embodiment shown, the multiplex entry descriptor for the third row indicates that the transmission data packet should include a complete audio protocol data unit having three slots worth of data and then two slots of a video protocol data unit having five slots of data, which will fill the remainder of the transmission data packet. The table row identifier can be included in the header slot data.

In this exemplary embodiment, the transmission data packet includes eight slots of data, where three of these slots are used for header and flag storage. Thus, of the remaining five slots in the eight slot field, the data shown in exemplary row one would allocate three slots for the audio data and two slots for video data. The number of slots of audio data can be correlated to the quality of audio data selected and the available bandwidth for the wireless handset. The video data is therefore transmitted as available, assuming that full audio rate data conversion is being used. For example, if audio data generation drops to zero, such as during a pause in a conversation, then the size of the audio field would likewise drop to zero and the entire five slots could be used to transmit video data.

Error control system 404 generates control record check data to be used by the receiving end to verify that a received field contains uncorrupted data. In one exemplary embodiment, error control system 404 interfaces with framing system 210 and multiplex system 204 to perform control record check processing on service data units of logical channel data received from an adaptation layer. Error control system 404 uses predetermined error checking algorithms and returns a number that is used by the receiving end, which performs the same error checking algorithm on received blocks of data to determine whether any data has become corrupted.

Packet marker system 406 is used to control packet field data in a transmission data packet to indicate if an audio or video or control data packet has been split in a transmission data packet, such that the next transmission data packet includes the remainder of the transmission data packet that was split. For example, in a sequence of three transmission data packets shown below, the video data packets have been assigned priority and the audio data packet is being transmitted on an as available basis. Thus,

[FLAG][HEADER, PM=0][VIDEO1][VIDEO2][VIDEO3]][AUDIO1][AUDIO2][FLAG]

[FLAG][HEADER, PM=1][VIDEO1][VIDEO2][VIDEO3]][VIDEO4][VIDEO5][FLAG]

[FLAG][HEADER, PM=1][VIDEO1][VIDEO2][AUDIO3]][AUDIO4][AUDIO5][FLAG]

The first transmission data packet includes a video data packet having three slots of data such that the audio data packet must take up the remainder two slots. The second transmission data packet includes a video data packet having five slots, such that the audio data packet is not completed in the second data transmission packet. The third data transmission packet includes a video data having two slots, such that the remainder three slots of audio data can be transmitted in the data packet. Packet marker system 406 tracks the completion of the audio data such that a packet marker data field in the header data for each data transmission packet or other suitable packet marker data indicates that an incomplete audio data packet is still awaiting transmission.

Flag system 408 inserts predetermined flag data at the beginning and end of a data transmission packet. This flag data can have a predetermined structure, such as "01111110," where flag system 408 or other suitable systems also scans service data packets for adaptation layer data to ensure that the similar sequence does not occur. Where a similar sequence occurs, flag system 408 or other suitable systems insert a zero after five ones have been transmitted. The receiving end removes the zero for payload data in the data transmission packet between the flag header and other flag.

In operation, system 400 is used to control transmission protocol in a wireless handset so as to allow audio and video data to be transmitted within the physical parameters of a wireless handset. System 400 includes a table of predetermined transmission protocol format data, and a header having a table row identifier that allows the protocol data to be determined by the sending and receiving entities without transmission of actual protocol parameters.

Figure 5:
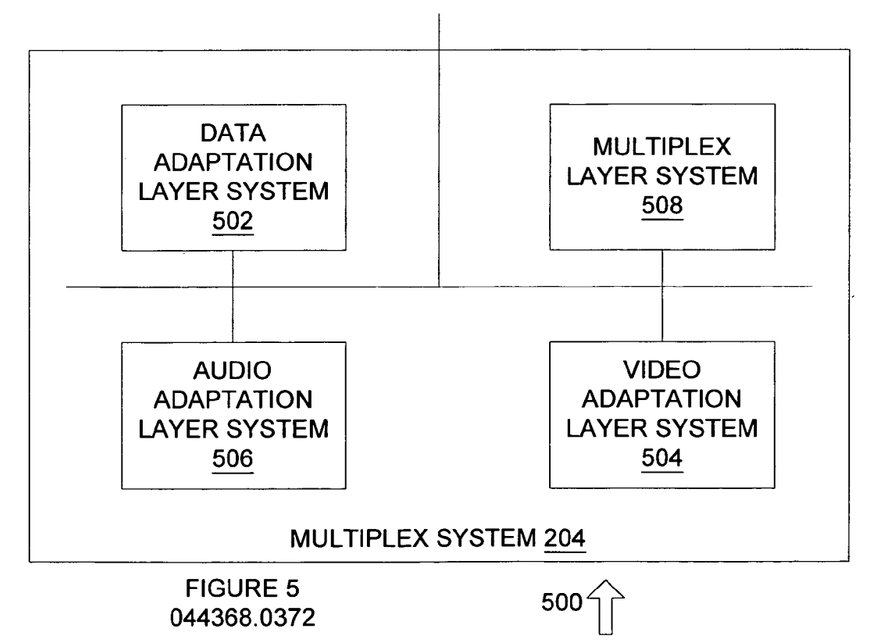
FIG. 5 is a diagram of a system for controlling the multiplexing of audio, video, and control data in a wireless handset in accordance with an exemplary embodiment of the present invention.

FIG. 5 is a diagram of a system 500 for controlling the multiplexing of audio data, video data, and control data in a wireless handset in accordance with an exemplary embodiment of the present invention. System 500 includes multiplex system 204, data adaptation layer system 502, video adaptation layer system 504, audio adaptation layer system 506, and multiplex layer system 508, each of which can be implemented in hardware, software, or a suitable combination of hardware and software, and which can be one or more software systems operating on a baseband processor of a wireless handset device.

Data adaptation layer system 502 receives control data and assembles the control data into an adaptation layer protocol data unit. Data adaptation layer system 502 can be framed or unframed, such that the control data is transmitted in accordance with the frames used by baseband processor 102, or in an unframed, superframe, or other suitable mode.

Video adaptation layer system 504 is used to receive processed video data and to assemble the processed video data into protocol data units for transmission. In one exemplary embodiment, video adaptation layer system 504 includes a 16-bit control record check error detection algorithm and supports optional sequence numbering that can be used to detect missing and misdelivered protocol data units. Variable length service data units can also be transmitted. In one exemplary embodiment, video adaptation layer system 504 allows one or more video service data units to be transmitted in a video protocol data unit. For example, a video protocol unit may include four video data octets, where the number of octets is dictated by the bandwidth and the processing capacity of the baseband processor. Each video service unit may be four or less octets, such as when video data is not required to change due to a constancy of the digital image received by the digital imager. In this exemplary embodiment, one or more frames of video data may be transmitted in a protocol data unit.

Audio adaptation layer system 506 receives digitally encoded audio data and assembles the digital data into a protocol data unit for transmission. Audio adaptation layer system 506 includes an 8-bit control record check for error detection and supports optional sequence numbering that can be used to detect missing and misdelivered octets in the protocol data units.

Multiplex layer system 508 assembles protocol data units from data adaptation layer 502, video adaptation layer 504, and audio adaptation layer 506 into transmission data packets. Multiplex layer system 508 ensures that flag data is included at the beginning of the first and last slot, and that header data having suitable header fields such as the multiplex table row number and the header error correction and packet marker fields are included in the transmission data packet.

In operation, system 500 is used to assemble data packets for transmission. System 500 interfaces with the adaptation layer, which is the layer in which data from audio, video, and control sources is assembled into data packets, and these data packets are then assembled into a transmission data packet.

Figure 6:
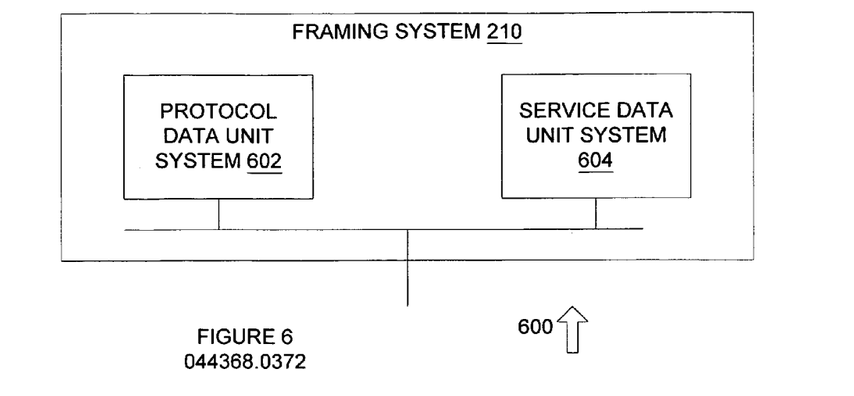
FIG. 6 is a diagram of a system for providing framing in accordance with an exemplary embodiment of the present invention.

FIG. 6 is a diagram of a system 600 for providing framing in accordance with an exemplary embodiment of the present invention. System 600 includes framing system 210, protocol data unit system 602, and service data unit system 604, each of which can be implemented in hardware, software, or a suitable combination of hardware and software, and which can be one or more software systems operating on a baseband processor of a wireless handset device.

Protocol data unit system 602 assembles data packets for exchange between the multiplex layer and the underlying physical layer, such as between controller 108 and audio data processor 110 and video data processor 112 of FIG. 1. Protocol data unit system 602 frames the data packet with high-level data link control ("HDLC") flags in accordance with ISO/IEC 3309 and performs HDLC zero-bit insertion for transparency. Protocol data unit system 602 can receive data packets from the physical layer, buffer the data, and assemble the data into packets for the multiplex layer, and can receive data packets from the multiplex layer, buffer the data, and assemble the data into packets for the physical layer.

Service data unit system 604 assembles data packets for exchange between the adaptation layer and the multiplex layer, such as in system 500 of FIG. 5. The data packets assembled by the service data unit system 604 map data from specific audio, video, or data devices, such that suitable devices may be readily accomodated within the system. Service data unit system 604 can receive data packets from the adaptation layer, buffer the data, and assemble the data into packets for the multiplex layer, and can receive data packets from the multiplex layer, buffer the data, and assemble the data into packets for the adaptation layer.

In operation, system 600 controls framing for data communications between the physical layer, the multiplex layer, and the adaptation layer for multimedia data in a wireless handset. System 600 determines and includes other suitable data in the frames as required, such as HDLC flagging and zero-bit insertion. In this manner, system 600 can conform the data frames to applicable standards.

Figure 7:
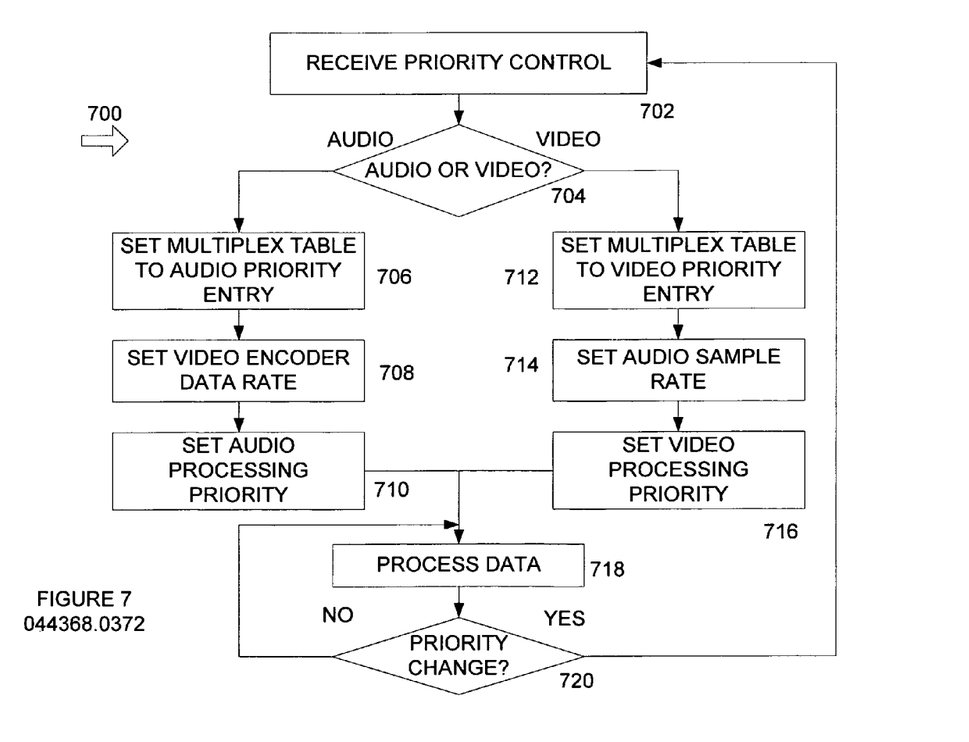
FIG. 7 is a flowchart of a method for setting priority in a wireless handset for processing of audio and video data in accordance with an exemplary embodiment of the present invention.

FIG. 7 is a flowchart of a method 700 for setting priority in a wireless handset for processing of audio and video data in accordance with an exemplary embodiment of the present invention. Method 700 can be used to set priority for audio over video, or video over audio.

Method 700 begins at 702 where priority control data is received. The priority control data can be a default data setting, can be user-entered, or can be other suitable priority control data. The method then proceeds to 704 where it is determined whether audio data or video data should have priority, including the level of priority to be given to the audio or video data. If it is determined at 704 that audio is to have priority over video, the method proceeds to 706.

At 706, the multiplex table entry corresponding to the appropriate audio priority entry is selected. For example, the processing and transmission of audio data can be given 100% priority, non-exclusive priority, or adjustable levels of audio data priority can be provided to allow the user to select a suitable setting. The method then proceeds to 708.

At 708, the video encoder data rate is set. For example, the video encoder data rate can be adjustable from one frame a second, to 30 frames a second, to a sub-number of frames per second, such as in a snapshot mode. The video encoder rate is then adjusted and the method proceeds to 710.

At 710, audio processing priority is set. For example, the processor can receive suitable control data that causes the processor to perform all audio data processing prior to performing any video data processing. Other suitable audio processing priority methods can be used, such as setting the number of processing cycles that audio data will receive. The method then proceeds to 718.

If it is determined at 704 that video data has priority, then the method proceeds to 712 where a multiplex table entry is set to the corresponding video priority. For example, the video data can be given 100% priority, or priority ranging between 100% and 50%. The method then proceeds to 714 where the audio data sample rate is set. The audio data sample rate is set in correlation to the amount of audio processor capacity that is anticipated to be available. The method then proceeds to 716 where video data processing priority is set on the processor. The method then proceeds to 718.

At 718, audio and video data are processed in accordance with predetermined priority settings. The method then proceeds to 720 where it is determined whether a priority change has been entered, such as when a user has selected to send video data from a 100% audio mode, or other suitable changes. If it is determined that a priority change has not been received at 720, the method returns to 718. Otherwise, the method returns to 702.

In operation, method 700 is used to set and adjust priority for audio data and video data processing and transmission in a wireless handset unit. Method 700 allows levels of audio or data processing capabilities, such as 100% audio, 100% video, or intermediate levels of audio and video, where audio data can be given priority over video, and audio and video data sampling rates can be adjusted. Method 700 thus allows wireless handset audio and video data to be adjusted in accordance with wireless handset physical requirements, such as power levels, transmission bandwidth, or other suitable information.

Figure 8:
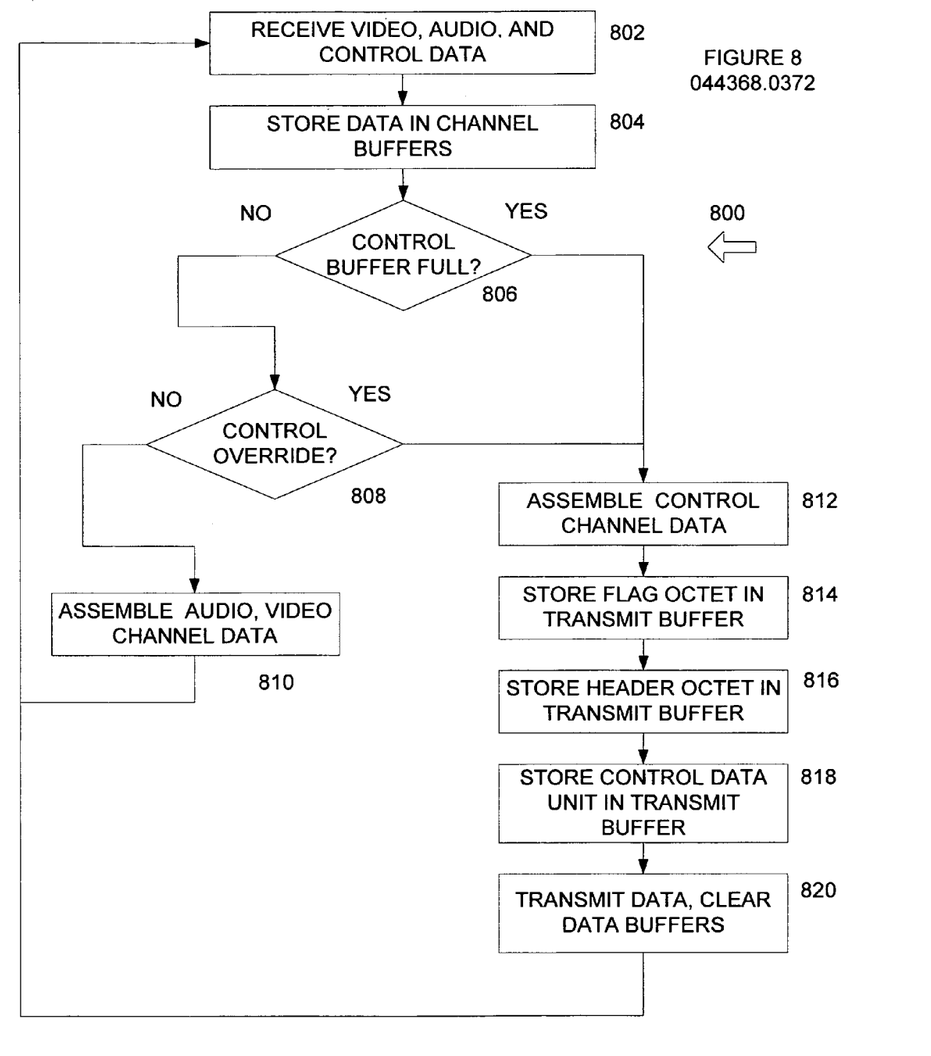
FIG. 8 is a diagram of a flowchart of a method for assembling transmission data packets in accordance with an exemplary embodiment of the present invention.

FIG. 8 is a diagram of a flowchart of a method 800 for assembling transmission data packets in accordance with an exemplary embodiment of the present invention. Method 800 allows control data to be provided with priority over audio data or video data, such as data that is required for adjusting wireless handset transceiver characteristics, keypad control data entry, or other suitable control data.

Method 800 begins at 802 where video data, audio data, and control data are received. The data can be received from an application layer, such as a cell phone microphone and analog to digital converter, a digital imager, a keypad, a voice recognition software system, or other suitable application layer systems. The data may then be converted into suitable protocol data units, service data units, data packets, or other suitable data structures. The method then proceeds to 804 where the data is stored in channel buffers. In one exemplary embodiment, the video data, audio data, and control data each have a dedicated channel buffer. The method then proceeds to 806.

At 806, it is determined whether the control data buffer is full. For example, control data may be transmitted periodically to control cell phone power levels or other suitable information. Likewise, a user may enter control data from a wireless handset keypad such as to change the priority to be given to audio and video data processing. If it is determined at 806 that the control buffer is not full, the method proceeds to 808 where it is determined whether a control override has been received. For example, a control override may be received when control data must be sent periodically, such as in accordance with a timing burst or sounding burst in a wireless data transmission system. If it is determined that a control override has not been received, the method proceeds to 810 where audio and video channel data are processed and assembled. The method then returns to 802.

If it is determined at 806 that the control buffer is full, or at 808 that a control override has been received, the method proceeds to 812 where control channel data is assembled. A flag data packet, such as an 8-bit data packet or octet in this exemplary embodiment, is then assembled at 814 in the data transmit buffer at the beginning and end of the data transmit buffer. A header data packet, such as an 8-bit data packet or octet, is then stored at 816 after the first flag buffer, and the method proceeds to 818.

At 818, control data units, such as 8-bit data packets or octets, are stored in the transmit buffer in accordance with a predetermined multiplex table entry. For example, when control data has priority, a multiplex table entry may be selected that identifies the correct structure for the data transmission packet. The method then proceeds to 820 where the data is transmitted and data buffers are cleared. The method then returns to 802.

In operation, method 800 allows control data to be sent regardless of the priority given to audio and video data so as to ensure that wireless handset operations can continue without interruption. Method 800 allows the audio and video data to be temporarily interrupted for transmission of control data, and then to be resumed without loss of data and corresponding interruption of service.

Figure 9:
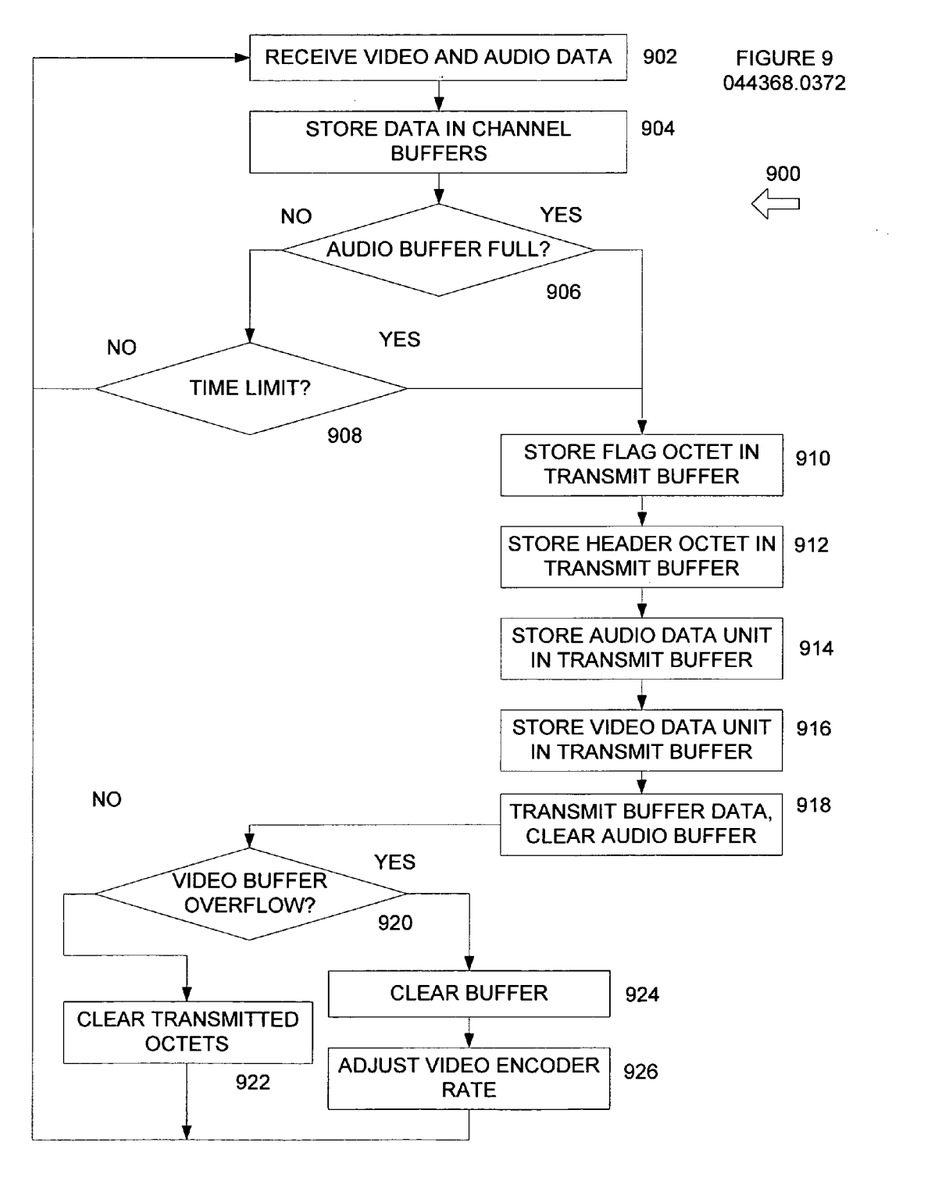
FIG. 9 is a flowchart of a method for transmitting audio and video data in accordance with an exemplary embodiment of the present invention.

FIG. 9 is a flowchart of a method 900 for transmitting audio and video data in accordance with an exemplary embodiment of the present invention. Method 900 can be used where audio data processing and transmission is given priority over video data processing and transmission, and can be readily adapted for use where the priority given to audio and video data is reversed by switching "audio" for "video" and "video" for "audio," where appropriate.

Method 900 begins at 902 where audio and video data are received. The method then proceeds to 904 where the data is stored in corresponding channel buffers. The method then proceeds to 906. If it is determined at 906 that an audio buffer is full, then the method proceeds to 910, otherwise the method proceeds to 908 where it is determined whether a time limit has been exceeded. In this exemplary embodiment, a certain amount of audio data is transmitted every period, such as background noise data or other suitable data. At 908 it is determined whether this period of time has been exceeded. If it is determined at 906 that the audio buffer is full or at 908 that the time limit has been exceeded, the method proceeds to 910. Otherwise, the method returns to 902.

At 910, a flag octet is stored in the transmit buffer at the beginning and end of the data transmission packet. The method then proceeds to 912 where a header octet is stored in the second slot position of the data transmission packet. The method then proceeds to 914.

At 914, the audio data unit is stored in the transmit buffer. For example, the audio data unit may include a predetermined maximum number of slots, such as five, when there are nine total slots in the transmit buffer between the header and flag slots. In this exemplary embodiment, four additional slots have remained for video data. The method then proceeds to 916 where the video data is stored in the available slots. The method then proceeds to 918 where the buffer data is transmitted and the audio buffer is cleared. The method then proceeds to 920.

At 920 it is determined whether video buffer overflow has occurred. For example, video data may be generated at a rate that exceeds the rate at which the video data can be transmitted. Likewise, constraints on processing power may result in video data that has a less efficient format than the video data may have if it is processed fully. If it is determined at 920 that video buffer overflow has not occurred, the method proceeds to 922 where the transmitted octets are cleared from the buffer and the method returns to 902. If it is determined that video buffer overflow has occurred at 920, the method proceeds to 924 where the video buffer is cleared and the video encoder rate is adjusted to decrease the amount of video data being processed. The method then returns to 902.

In operation, method 900 allows audio data to be processed and transmitted in preference to video data, and also allows video data rate to be adjusted to compensate for differences in the video data rate and the amount of bandwidth available to transmit video data. Method 900 can also be used for transmitting video in preference to audio, with the noted substitutions and modifications.

Figure 10:
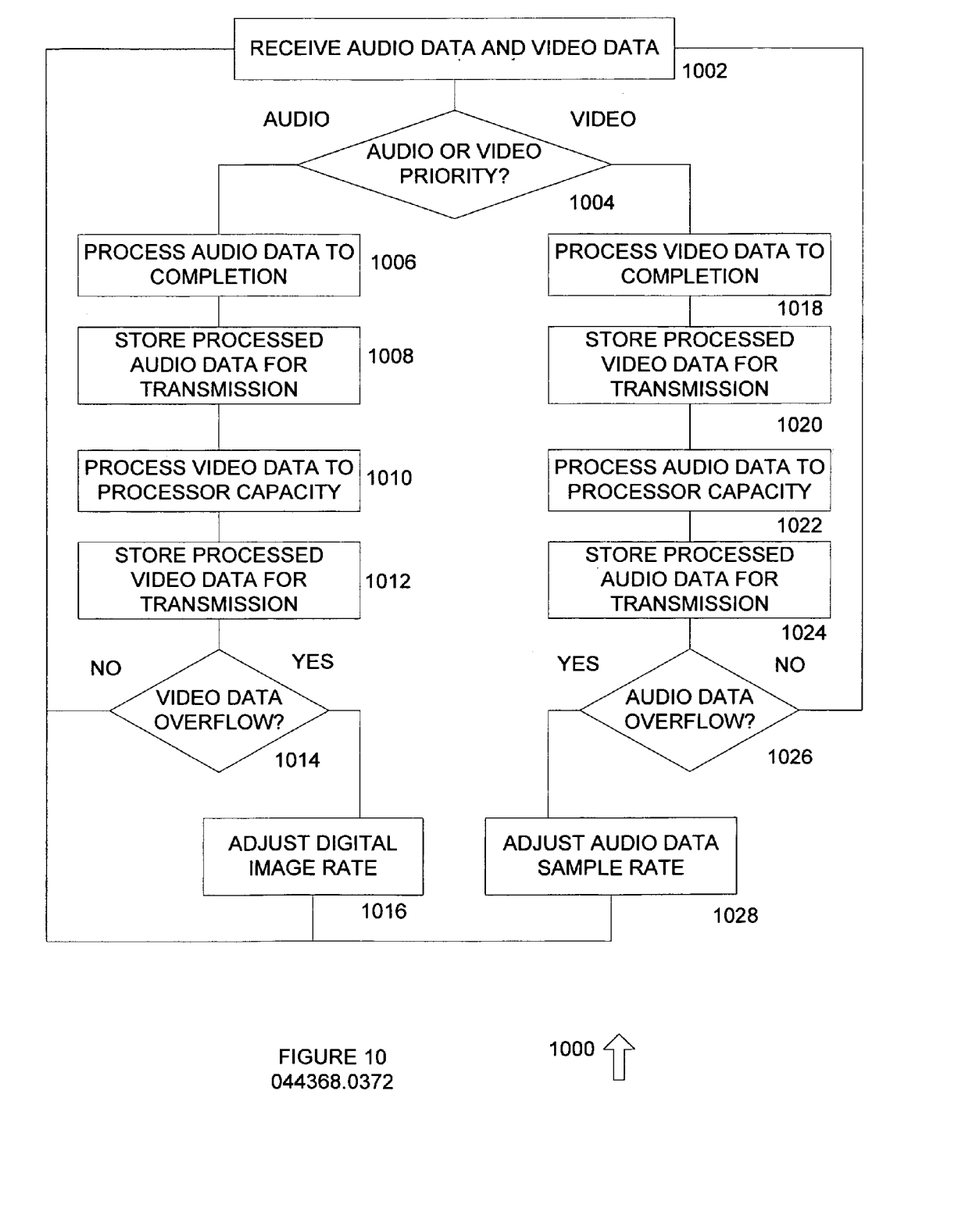
FIG. 10 is a flowchart of a method for processing audio and video data in accordance with an exemplary embodiment of the present invention.

FIG. 10 is a flowchart of a method 1000 for processing audio data and video data in accordance with an exemplary embodiment of the present invention. Method 1000 can be used to process audio data and video data in a wireless handset unit which has limited processing capacity and power.

Method 1000 begins at 1002 where audio data and video data are received. The method then proceeds to 1004 where it is determined whether audio data or video data has priority. The priority can also be relative, such that the audio data has relative priority over video data but not complete priority. If it is determined at 1004 that audio data has relative priority over video data, the method proceeds to 1006.

At 1006, the audio data is processed to completion. For example, the processor may receive predetermined amounts of audio data and may process the audio data until it has been fully compressed and encoded for transmission. The method then proceeds to 1008 where the processed audio data is stored for transmission, such as in a service data unit system or protocol data unit system. The method then proceeds to 1010 where the video data is processed to the remaining amount of processor capacity. For example, the processor may work in cycles and the amount of video data required for processing may exceed the amount of cycle times left. In this exemplary embodiment, the video data is processed until the number of processor cycles remaining is exceeded and then the method proceeds 1012.

At 1012, the processed video data is stored for transmission. The method then proceeds to 1014 where it is determined whether video data overflow has occurred. In one exemplary embodiment, the video data that remains unprocessed may be stored in a buffer such that additional video data is stored in the buffer until the buffer is full. If it is determined that video data overflow has not occurred, the method returns to 1002, otherwise the method proceeds to 1016 where the digital image generation rate is adjusted, such as by changing the number of image screen scans per second that are generated by a digital image generation chip. The method then returns to 1002.

If it is determined at 1004 that video data has priority, the method proceeds to 1018 where video data is processed to completion, such as to compress the data, and encode the data into a predetermined data transmission format. The method then proceeds to 1020 where the processed video data is stored for transmission.

At 1022 the audio data is processed to processor capacity, such as for a remaining number of processor cycles in a period. The method then proceeds to 1024 where the processed audio data is stored for transmission. The method then proceeds to 1026 where it is determined whether audio data overflow has occurred. If no audio data overflow has occurred, the method returns to 1002, otherwise the method proceeds to 1028 where audio data sample rate is adjusted to decrease the amount of audio data generated. Likewise, the amount of audio data can be increased just as the amount of digital image data can be increased after step 1014 before it returns to 1002.

In operation, method 1000 allows audio data and video data processing priority to be set so that one has priority over the other. Method 1000 also allows video digital image rate scanning and audio sample rates to be adjusted to produce a suitable amount of data in accordance with processor capacity availability and requirements.

Although exemplary embodiments of a system and method for processing and transmitting audio and video data in a wireless handset have been described in detail herein, those skilled in the art will also recognize that various substitutions and modifications can be made to the systems and methods without departing from the scope and spirit of the appended claims.

The invention claimed is:

1. A system for processing audio and video data for a wireless handset comprising:
   controller means for generating priority data;
   a plurality of channel buffers, wherein each channel buffer represents a logically separate channel of data; and
   transmission buffer means for receiving the priority data and data from one or more of the channel buffers and storing the data from the channel buffers in a buffer, where the number of channel buffers to receive data from and the amount of data to be received from each channel buffer is determined by the priority data.

2. The system of claim 1 wherein the plurality of channel buffers further comprises an audio data buffer.

3. The system of claim 1 wherein the plurality of channel buffers further comprises a video data buffer.

4. The system of claim 1 wherein the plurality of channel buffers further comprises a control data buffer.

5. The system of claim 1 wherein the controller means generates priority data based on transmission channel bandwidth.

6. The system of claim 1 wherein the controller means generates priority data based on processor capacity of a wireless handset processor.

7. The system of claim 1 her comprising:
   wherein the plurality of channel buffers further comprises:
   an audio data buffer;
   a video data buffer; and
   a control data buffer; and
   wherein the controller means generates priority data based on transmission channel bandwidth and on processor capacity of a wireless handset processor that changes the amount and sequence of data from the audio data buffer, the video data buffer, and the control data buffer that is stored in the transmission buffer means.

8. The system of claim 1 wherein the controller means receives user control data and uses the user control data to generate the priority data.

9. The system of claim 7 wherein the controller means receives user control data and uses the user control data to generate the priority data that changes the amount and sequence of data from the audio data buffer, the video data buffer, and the control data buffer that is stored in the transmission buffer means.

10. A method for processing audio and video data for a wireless handset comprising:
    generating priority data;
    storing data in a plurality of channel buffers, where each channel buffer represents a logically separate channel of data; and
    determining the number of channel buffers to receive data from based on the priority data;
    determining the amount of data to be received from each channel buffer by the priority data; and
    storing the data from each selected charnel buffer in a transmission buffer.

11. The method of claim 10 wherein storing data in the plurality of channel buffers further comprises storing the data in an audio data buffer.

12. The method of claim 10 wherein storing data in the plurality of channel buffers further comprises storing the data in a video data buffer.

13. The method of claim 10 wherein storing data in the plurality of channel buffers further comprises storing the data in a control data buffer.

14. The method of claim 10 wherein generating priority data comprises generating priority data based on transmission channel bandwidth.

15. The method of claim 10 wherein generating priority data comprises generating priority data based on processor capacity of a wireless handset processor.

16. A method for processing audio and video data for a wireless handset comprising:
    generating priority data based on transmission channel bandwidth and on processor capacity of a wireless handset processor;
    storing data in an audio data buffer;
    storing data in a video data buffer;
    storing data in a control data buffer;
    determining a number of channel buffers to receive data from based on the priority data;
    determining an amount and a sequence of data from the audio data buffer, the video data buffer, and the control data buffer that is to be stored in a transmission buffer based on the priority data; and storing the data from each selected channel buffer in the transmission buffer.

17. The method of claim 16 further comprising:

receiving user-entered control data; and generating the priority data from the user-entered control data.

18. The method of claim 16 further comprising:

receiving user control data; and generating priority data that changes the amount and sequence of data from the audio data buffer, the video data buffer, and the control data buffer that is stored in the transmission buffer from the user control data.

19. The system of claim 7 further comprising priority data associated with each channel buffer, wherein audio data can have a lower priority than video data or control data.

20. The method of claim 16 wherein determining the amount and the sequence of data from the audio data buffer, the video data buffer, and the control data buffer that is to be stored in the transmission buffer based on the priority data further comprises allowing only null data from one of the audio data buffer, the video data buffer, or the control data buffer to be stored in the transmission buffer if the associated buffer is empty, priority is allocated only to the associated buffer, and data is present in the other buffers.

* * * * *

UNITED STATES PATENT AND TRADEMARK OFFICE
CERTIFICATE OF CORRECTION

PATENT NO. : 7,120,162 B1　　　　　　　　　　　　　　　　　　　　　　　　Page 1 of 1
APPLICATION NO. : 09/631511
DATED : October 10, 2006
INVENTOR(S) : Katibian et al.

It is certified that error appears in the above-identified patent and that said Letters Patent is hereby corrected as shown below:

Col. 16, line 4, change "her" to -- further -- ;

Col. 16, line 33, change "the" to -- an -- ;

Col. 16, line 35, change "charnel" to -- channel -- .

Signed and Sealed this

Twenty-sixth Day of December, 2006

JON W. DUDAS
*Director of the United States Patent and Trademark Office*